US009405319B2

(12) United States Patent
Salo et al.

(10) Patent No.: US 9,405,319 B2
(45) Date of Patent: Aug. 2, 2016

(54) CASING

(75) Inventors: Antti Salo, Lohja (FI); Jarkko T. Saunamaki, Vantaa (FI); Teppo Tapani Jokinen, Espoo (FI); Anssi I. Vanska, Helsinki (FI); Matti Kosonen, Jarvenpaa (FI)

(73) Assignee: Nokia Technologies Oy, Espoo (FI)

( * ) Notice: Subject to any disclaimer, the term of this patent is extended or adjusted under 35 U.S.C. 154(b) by 385 days.

(21) Appl. No.: 13/328,552

(22) Filed: Dec. 16, 2011

(65) Prior Publication Data

US 2013/0154914 A1 Jun. 20, 2013

(51) Int. Cl.
*G06F 1/16* (2006.01)
*H04M 1/18* (2006.01)
*H04M 1/725* (2006.01)

(52) U.S. Cl.
CPC ............ *G06F 1/1632* (2013.01); *G06F 1/1628* (2013.01); *H04M 1/185* (2013.01); *H04M 1/72527* (2013.01); *H04M 2250/12* (2013.01)

(58) Field of Classification Search
CPC .... G06F 1/1628; G06F 1/1632; H04M 1/185; H04M 1/72527; H04M 2250/12
USPC ................. 345/156–184; 361/679.01, 679.07
See application file for complete search history.

(56) References Cited

U.S. PATENT DOCUMENTS

| 6,160,540 | A   | * | 12/2000 | Fishkin ................... A63F 13/00 345/156 |
| 6,243,074 | B1  | * | 6/2001  | Fishkin ..................... G06F 1/16 345/156 |
| 6,243,075 | B1  | * | 6/2001  | Fishkin ..................... G06F 1/16 345/156 |
| 6,268,857 | B1  | * | 7/2001  | Fishkin ..................... G06F 1/16 345/156 |
| 6,297,838 | B1  | * | 10/2001 | Chang ....................... G06F 1/16 345/156 |
| 6,462,942 | B1  |   | 10/2002 | McClendon et al. ......... 361/683 |
| 6,535,199 | B1  |   | 3/2003  | Canova, Jr. et al. .......... 345/168 |
| 6,785,566 | B1  | * | 8/2004  | Irizarry ...................... 455/575.8 |
| D582,405  | S   | * | 12/2008 | Andre et al. ................... D3/299 |
| 7,778,023 | B1  | * | 8/2010  | Mohoney ................. 361/679.41 |
| 9,250,701 | B2  | * | 2/2016  | Kim .......................... G06F 3/01 |
| 2003/0073462 | A1 |   | 4/2003  | Zatloukal et al. ............. 455/558 |
| 2004/0008191 | A1 | * | 1/2004  | Poupyrev ................ G06F 3/011 345/184 |
| 2004/0087335 | A1 | * | 5/2004  | Peiker ........................ 455/556.2 |
| 2008/0222571 | A1 | * | 9/2008  | Yoshioka ...................... 715/841 |

(Continued)

FOREIGN PATENT DOCUMENTS

GB 2376758 A 12/2002
JP 2008199603 A 8/2008

(Continued)

OTHER PUBLICATIONS

Lahey, et al., PaperPhone: "Understanding the Use of Bend Gestures in Mobile Devices with Flexible Electronic Paper Displays", (2011), (pp. 10 pages).

(Continued)

*Primary Examiner* — Dmitriy Bolotin
(74) *Attorney, Agent, or Firm* — Harrington & Smith

(57) ABSTRACT

A casing, method and apparatus wherein the casing includes at least one user deformable portion; at least one sensor configured to detect deformation of the at least one user deformable portion; wherein the casing is configured to be removably coupled to an apparatus and is configured so that, in response to detecting the deformation of the user deformable portion of the casing, a control signal for control of the apparatus is provided.

19 Claims, 6 Drawing Sheets

(56) References Cited

U.S. PATENT DOCUMENTS

| | | | |
|---|---|---|---|
| 2009/0168088 A1* | 7/2009 | Rosenblatt | 358/1.12 |
| 2010/0011291 A1* | 1/2010 | Nurmi | G06F 3/0414 715/702 |
| 2010/0013775 A1* | 1/2010 | Son | 345/168 |
| 2010/0078343 A1* | 4/2010 | Hoellwarth et al. | 206/320 |
| 2011/0090626 A1* | 4/2011 | Hoellwarth et al. | 361/679.01 |
| 2011/0167391 A1* | 7/2011 | Momeyer | G06F 1/1684 715/863 |
| 2011/0227822 A1 | 9/2011 | Shai | 345/156 |
| 2012/0319960 A1* | 12/2012 | Kildal | G06F 3/0487 345/173 |
| 2013/0069859 A1 | 3/2013 | Saila et al. | 345/156 |
| 2014/0111549 A1* | 4/2014 | Vanska | G06F 1/1626 345/656 |

FOREIGN PATENT DOCUMENTS

| | | | |
|---|---|---|---|
| WO | WO-03/048938 | A1 | 6/2003 |
| WO | WO 2004/036881 | A2 | 4/2004 |
| WO | WO-2004/114239 | A2 | 12/2004 |
| WO | WO-2010/078557 | A2 | 7/2010 |
| WO | WO 2011/061511 | A1 | 5/2011 |

OTHER PUBLICATIONS

Kwon, et al., "Mechanically and optically reliable folding structure with a hyperelastic material for seamless foldable displays", (2011), (pp. 151904-1 though 151904-3).

Wightman, et al., "BendFlip: Examining Input Techniques for Electronic Book Readers with Flexible Form Factors", (2011), (pp. 117-133).

Schwesig, et al., "Gummi: A Bendable Computer", (2004), (8 pages).

Watanabe, et al., "Bookisheet: Bendable Device for Browsing Content Using the Metaphor of Leafing Through the Pages", (2008), (pp. 360-369).

Lee, et al., "How Users Manipulate Deformable Displays as Input Deviceg", (2010), (pp. 1647-1656).

Tajika et al., "Intuitive Page-turning Interface of E-books on Flexible E-paper based on User Studies", (2008), (pp. 793-796).

Gallant, et al., "Towards More Paper-like Input: Flexible Input Devices for Foldable International Styled", (2008), (pp. 283-286).

Carsten Schwesig, "What Makes an Interface feel Organic?", (Jun. 2008), (pp. 67-69).

Harrison, et al., "Squeeze Me, Hold Me, Tilt Me! An Exploration of Manipulative User Interfaces", (1998), (pp. 17-24).

Herkenrath, et al., "TWEND: Twisting and Bending as new Interaction Gesture in Mobile Devices", (2008), (pp. 3819-3824).

Schwesig, et al., "Gummi: User Interface for Deformable Computerg", (2003), (2 pages).

Vertegaal, et al., "Organic User Interfaces", (Jun. 2008), (pp. 26-30).

Scott, et al., "I Sense a Disturbance in the Force: Mobile Device Interaction with Force Sensing", (2008), (10 pages).

Ye, et al., "Cobra: Flexible Displays for Mobile Gaming Scenarios", (2010), (pp. 1-5).

Murata Manufacturing, "Development of Sensor Device Using High-transparency Organic Piezoelectric Film", (2011), (10 pages).

* cited by examiner

CASING

TECHNOLOGICAL FIELD

Embodiments of the present disclosure relate to a casing. In particular, they relate to casing for providing a protective housing or covering for an apparatus such as a mobile cellular telephone or other portable apparatus.

BACKGROUND

Apparatus which enable user to make user inputs and control the apparatus are known. It is beneficial to enable the apparatus to be configured to enable user to make quick, simple and intuitive inputs as this makes the apparatus easier and more convenient for the user to use.

BRIEF SUMMARY

According to various, but not necessarily all, embodiments of the disclosure there is provided a casing comprising: at least one user deformable portion; at least one sensor configured to detect deformation of the at least one user deformable portion; wherein the casing is configured to be removably coupled to an apparatus and is configured so that, in response to detecting the deformation of the user deformable portion of the casing, a control signal for control of the apparatus is provided.

In some embodiments the user deformable portion may comprise a part of an outer surface of the casing.

In some embodiments the casing may be configured to protect the apparatus from mechanical shocks.

In some embodiments the casing may be configured to protect the apparatus from environmental damage.

In some embodiments the casing may comprise part of a housing for the apparatus. In other embodiments the casing may comprise a covering configured to receive an apparatus wherein the apparatus comprises a first housing.

In some embodiments the at least one user deformable portion may be configured to change shape in response to a physical force applied by the user to the at least one user deformable portion.

In some embodiments the casing may comprise a recess and at least part of an apparatus may fit within the recess such that a user can place an apparatus within the recess and also remove the apparatus from the recess.

In some embodiments the casing may comprise an interface configured to enable a control signal to be transmitted from the casing to the apparatus. The interface may be configured to enable a control signal to be transmitted to an apparatus removably coupled to the casing. In some embodiments the interface may be configured to enable a control signal to be transmitted to an apparatus remote from the casing.

In some embodiments the casing may be configured to convert an output from the one or more sensors into the control signal which is transmitted over the interface.

In some embodiments the control signal may comprise data which, when transmitted to the apparatus, causes the apparatus to perform a function.

According to various, but not necessarily all, embodiments of the disclosure there is also provided a method comprising: detecting a user input comprising deforming at least one user deformable portion of a casing of an apparatus; providing, in response to detecting the user input, a control signal to an apparatus configured to be removably coupled to the casing, to cause the apparatus to perform a function.

In some embodiments the user deformable portion may comprise a part of an outer surface of the casing.

In some embodiments the casing may be configured to protect the apparatus from mechanical shocks.

In some embodiments the casing may be configured to protect the apparatus from environmental damage.

In some embodiments the casing may comprise part of a housing for the apparatus.

In some embodiments the casing may comprise a covering configured to receive an apparatus wherein the apparatus comprises a first housing.

In some embodiments the at least one user deformable portion may be configured to change shape in response to a physical force applied by the user to the at least one user deformable portion. In other embodiments the casing may comprise a recess and at least part of an apparatus may fit within the recess such that a user can place an apparatus within the recess and also remove the apparatus from the recess.

In some embodiments the casing may comprise an interface configured to enable a control signal to be transmitted from the casing to the apparatus. In some embodiments the interface may be configured to enable a control signal to be transmitted to an apparatus removably coupled to the casing. In some embodiments the interface may be configured to enable a control signal to be transmitted to an apparatus remote from the casing.

In some embodiments the method may further comprise converting an output from the one or more sensors into the control signal which is transmitted over the interface.

In some embodiments the control signal may comprise data which, when transmitted to the apparatus, causes the apparatus to perform a function.

According to various, but not necessarily all, embodiments of the disclosure there is also provided a computer program comprising computer program instructions that, when executed by at least one processor, enable a casing at least to perform: detecting a user input comprising deforming at least one user deformable portion of a casing of an apparatus; providing, in response to detecting the user input, a control signal to an apparatus configured to be removably coupled to the casing, to cause the apparatus to perform a function.

In some embodiments there may also be provided a computer program comprising program instructions for causing a computer to perform the method as described above.

In some embodiments there may also be provided a non-transitory entity embodying the computer program as described above.

In some embodiments there may also be provided an electromagnetic carrier signal carrying the computer program as described above.

According to various, but not necessarily all, embodiments of the disclosure there is also provided an apparatus comprising: at least one processor; and at least one memory including computer program code; wherein the at least one memory and the computer program code are configured to, with the at least one processor, enable the apparatus to: receive control signals from a casing which is configured to be removably coupled to the apparatus, wherein the control signals are provided in response to a user deforming a portion of the casing, and in response to receiving the control signal, control the apparatus to perform a function.

In some embodiments the apparatus may comprise an interface configured to enable the control signal to be received from the casing.

In some embodiments the apparatus may be configured to fit in a recess of the casing.

In some embodiments the apparatus may comprise a user input device.

The casing may be for providing a protective housing or covering for an apparatus such as a mobile cellular telephone.

BRIEF DESCRIPTION

For a better understanding of various examples of embodiments of the present disclosure reference will now be made by way of example only to the accompanying drawings in which.

DETAILED DESCRIPTION

The Figures illustrate a casing 21 comprising: at least one user deformable portion 23; at least one sensor 27 configured to detect deformation of the at least one user deformable portion 23; wherein the casing 21 is configured to be removably coupled to an apparatus 1 and is configured so that, in response to detecting the deformation of the user deformable portion 23 of the casing 21, a control signal for control of the apparatus 1 is provided.

In the following description, unless expressly stated otherwise, the words "connect" and "couple" and their derivatives mean operationally connected or operationally coupled. It is to be appreciated that any number or combination of intervening components can exist including no intervening components.

Figure 1:
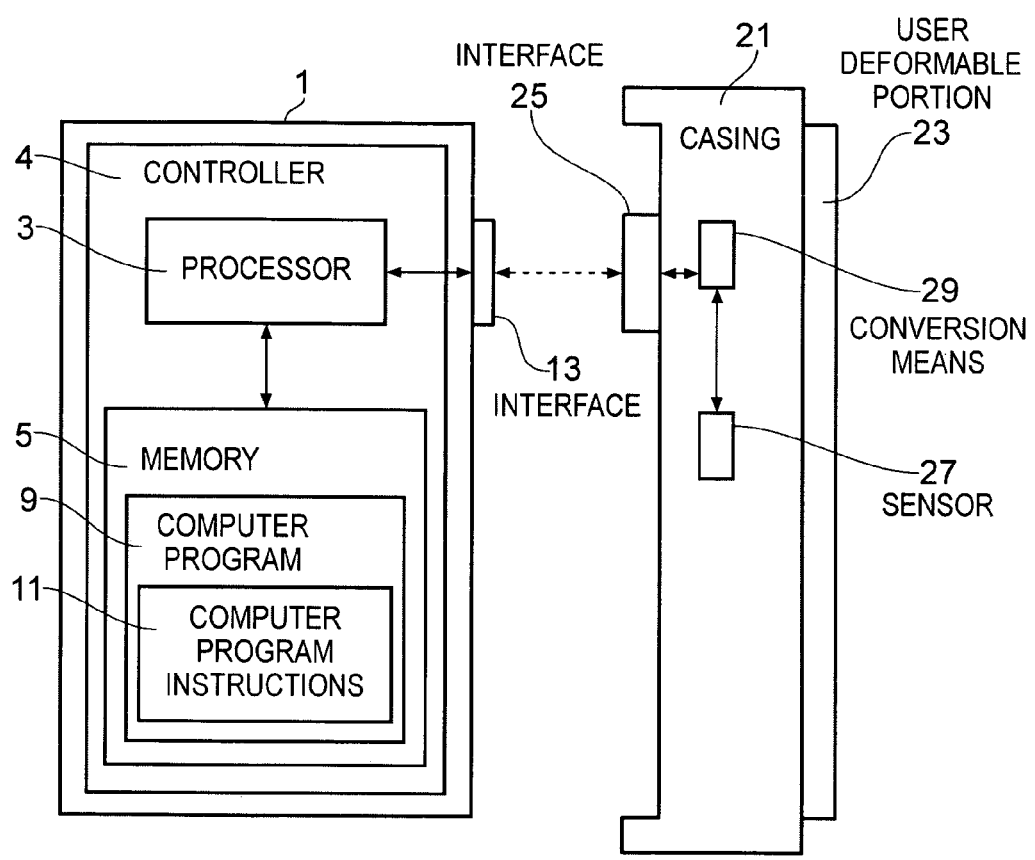
FIG. 1 illustrates a casing and an apparatus according to an embodiment of the disclosure.

FIG. 1 schematically illustrates a casing 21 removable coupled to an apparatus 1. Only features referred to in the following description are illustrated in FIG. 1. However, it should be understood that the apparatus 1 and the casing 21 may comprise additional features that are not illustrated.

The apparatus 1 illustrated in FIG. 1 may comprise the engine of an electronic apparatus such as a mobile cellular telephone, a personal computer, a camera, a gaming device, a personal digital assistant, a personal music player, a table computer or any other apparatus 1. The apparatus 1 may be a handheld apparatus 1 which can be carried in a user's hand, handbag or pocket of their clothing for example.

In the exemplary embodiment of FIG. 1 the casing 21 may comprise part of the housing of the apparatus 1. The housing may be configured to protect the electronic components and other sensitive components of the engine of the apparatus 1. The housing and the apparatus 1 illustrated in FIG. 1 may be coupled together to form a complete electronic apparatus such as a mobile cellular telephone.

The apparatus 1 illustrated in FIG. 1 comprises: a controller 4 and an interface 13. In the illustrated embodiment the controller 4 comprises at least one processor 3 and at least one memory 5. The casing 21 illustrated in FIG. 1 comprises at least one user deformable portion 23, at least one sensor 27 and an interface 25. In the embodiment illustrated in FIG. 1 the casing 21 also comprises conversion means 29.

The controller 4 of the apparatus 1 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc) to be executed by such processors 3.

The controller 4 may be configured to control the apparatus 1 to perform a plurality of different functions. For example, where the apparatus 1 is a mobile cellular telephone the controller 4 may be configured to control the apparatus 1 to make and receive telephone calls and also to perform other functions such as send messages or access communication networks such as local area networks or the internet.

The at least one processor 3 is configured to write to and read from the at least one memory 5. The at least one memory 5 is configured to store a computer program code 9 comprising computer program instructions 11 that control the operation of the apparatus 1 when loaded into the at least one processor 3. The at least one processor 3 by reading the at least one memory 5 is able to load and execute the computer program 9.

The computer program instructions 11 may provide computer readable program means configured to control the apparatus 1.

The computer program code 9 may arrive at the apparatus 1 via any suitable delivery mechanism 21. The delivery mechanism 21 may be, for example, a tangible, non-transitory, computer-readable storage medium, a computer program product 23, a memory device, a record medium such as a CD (compact disc) or DVD (digital versatile disc) or Blu-ray disc, an article of manufacture that tangibly embodies the computer program code 9. The delivery mechanism may be a signal configured to reliably transfer the computer program code 9. The apparatus 1 may propagate or transmit the computer program code 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application integration specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The interface 13 may comprise any means which is suitable to enable the apparatus 1 to transmit and receive data. The interface 13 may be configured to couple to a corresponding interface 25 on the casing 21 to enable the apparatus 1 to receive control signals from the casing 21. The interface 13 may also be configured to enable the apparatus 1 to receive other data from the casing 21. In some embodiments of the disclosure the interface 13 may be configured to enable control signals and/or other data to be transmitted from the apparatus 1 to the casing 21.

The interfaces 13, 25 may comprise a data connector such as USB OTG (universal serial bus on-the go) connector, a memory card interface, an AV (audio and video) connector, an IIC (I2C—Inter-integrated circuit) connector or any other suitable connector. In other embodiments the interfaces 13, 25 may comprise a wireless connection such as infra red connection, Bluetooth, Bluetooth low energy, wireless LAN (local area network) or near field communication link or any other suitable wireless connection.

In some embodiments the interfaces, 13, 25 may also comprise means for transferring power between the apparatus and the casing 21. In some embodiments the apparatus 1 may be configured to transfer power to the casing 21 using a power output such as USB, USB OTG, IIC connector or a memory card interface. In some embodiments the same interface 13, 25 may be used to transfer data and power. In other embodiments a separate interface maybe provided for the transfer of power. In other embodiments the casing 21 may be configured to collect and/or store its own power, for example the casing 21 may be configured to harvest power from a wireless signal such as a radio-frequency signal which is transmitted or received by the apparatus 1 or by inductive coupling to the apparatus 1.

In some embodiments of the disclosure the interface between the casing 21 and the apparatus 1 may comprise an intermediate node. For example data and/or power may be wirelessly transmitted through an intermediate device such as a server. This may be used, for example, in embodiments where the apparatus 1 is connected to a WLAN or a cloud application.

The casing 21 is configured to be coupled to the apparatus 1. In some embodiments the casing 21 may be coupled directly to the apparatus 1 without any intervening components. For example, the casing 21 may comprises a recess which is sized and shaped so that the apparatus 1 may be received within the recess. In such embodiments the casing and/or the apparatus 1 may comprise attachment means which enable the apparatus 1 to be securely attached to the casing 21 to avoid the apparatus 1 being unintentionally decoupled from the casing 21. The attachment means may enable a user of the apparatus 1 to attach and detach the casing 21 so that the casing 21 may be removably attached to the apparatus 1.

In other embodiments of the disclosure the casing 21 may be indirectly coupled to the apparatus 1 so that there are one or more intervening components between the casing 21 and the apparatus 1.

The casing 21 may comprise any means which is configured to provide physical protection for the apparatus. For example the casing 21 may be configured to protect the apparatus from mechanical shock or from environmental damage such as fluid ingress or temperature variations.

The casing 21 may comprise part of the housing of the apparatus 1. The casing 21 may be one of a plurality of components which may be connected together to form a housing for the apparatus 1.

In some embodiments the other components of the housing may comprise components of a user interface such as a display or a user input device such as a keypad or touch sensitive display. In such embodiments 21 the casing 21 illustrated in FIG. 1 may form the back and/or the sides of the housing.

In some embodiments the casing 21 may comprise a rigid portion so that when the apparatus 1 is contained within the housing formed by the casing 21 the housing provides mechanical protection for the apparatus 1.

The casing 21 comprises at least one user deformable portion 23. In the exemplary schematic illustration of FIG. 1 the user deformable portion 23 has been illustrated as forming the back of the casing 21. It is to be appreciated that the user deformable portion 23 may form any suitable part of the casing 21. For example, the user deformable portion 23 may be located around the edge or the side of the casing 21 or may form part of the means for removable coupling the casing 21 to an apparatus 1.

The at least one user deformable portion 23 may comprise any means which may be configured to change shape in response to a physical force applied by a user. The change in shape may comprise bending, folding, twisting, stretching, compression or any other suitable deformation of a portion of the casing 21. The at least one user deformable portion 23 may be configured to automatically return to its equilibrium shape when the force applied by the user is removed.

In some embodiments of the disclosure the at least one deformable portion 23 may comprise a flexible substrate which may be bent, stretched, squeezed or twisted by a user. The flexible substrate may comprise a plastic material, elastomeric material, metallic material, foam or any other elastic material which may be deformed in response to a force applied by the user of the apparatus 1. In other embodiments the at least one deformable portion 23 may comprise a deformable material such as a gel, powder or fluid in a sealed sac. The material may comprise a resiliently deformable material so that it is configured to return to an equilibrium shape once the force applied by the user has been removed.

In other embodiments the at least one deformable portion 23 may comprise a plurality of hinged or jointed segments. The hinged or jointed segments may be configured to be moved with respect to each other to enable a portion of the casing 21 to be folded or bent. The casing 21 may be folded, stretched, squeezed, twisted or bent in response to a force applied by the user of the apparatus 1.

The at least one user deformable portion 23 may be configured to provide part of the outer surface of the casing 21. The at least one user deformable portion 23 may be configured to enable a user to apply a force directly to the at least one user deformable portion 23 without any intervening components.

The casing 21 or the surface of the casing 21 may be configured to provide the user of the apparatus 1 with an indication of the location of the user deformable portion 23. For example, the at least one user deformable portion 23 may be configured so that a user can distinguish it from the rest of the casing 21 through touch. For example, the user deformable portion 23 may be shaped to comprise a projection or area with different cross section to the rest of the casing. In other embodiments the texture of the of the user deformable portion 23 may be different to the rest of the casing 21, for example the user deformable portion 23 may have a rougher or smoother surface compared to the rest of the casing 21. In some embodiments the user deformable portion 23 may be a different temperature to the rest of the casing 21. The change in temperature may be created by, for example a heating element such as a strain gauge.

In some embodiments of the disclosure the surface of the casing 21 may be provided with a visual indication of the location of the user deformable portion 23. For example the user deformable portion 23 may be a different colour or may have different light reflecting or emitting properties to the rest of the casing 21.

The sensor 27 may comprise any means which is configured to detect a change in shape of the at least one user deformable portion 23. In some embodiments of the disclosure the casing 21 may comprise a plurality of sensors 27.

The type of sensors 27 used may depend upon the number and type of user deformable portions 23 used in the casing 21 and also the type of deformations which are to be detected.

In some embodiments of the disclosure the sensors 27 may comprise any means which may be configured to detect a change in electrical properties of the casing 21 such as the resistance or conductivity or capacitance of the casing 21. Such sensors 27 may comprise strain gauges or piezo-resistive sensors. The piezo-resistive sensors may comprise silicon nanowires or piezo-resistive inks, gels, elastomers or foams or any other suitable means. In other embodiments the deformation may be detected by detecting a change in the position of a contact point and a resultant change in the length of a resistive circuit.

In some embodiments of the disclosure the sensors 27 may comprise electromechanical film such as a permanently charged ferroelectric film that is configured to convert mechanical stress into electrical energy. The amount of electrical energy produced may be proportionate to the stress applied to the film.

In some embodiments of the disclosure the casing 21 may comprise piezoelectric materials which are configured so that the deformation of the user deformable portion 23 creates a charge within the casing 21 which may be sensed by one or more sensors 27. For example the user deformable portion 23 may comprise piezoelectric foils or piezo-electric wires.

In some embodiments of the disclosure the user deformable portion 23 may comprise an optical cable and the sensors 27. The deformation of the user deformable portion 23 may affect the optical properties of the cable, for example bending the cable or inducing strain in the cable may affect the amount of light which may be totally internally reflected or may change the point at which light would be reflected back to an emitter. The sensors 27 may be configured to determine the time taken for a light signal to be reflected.

The sensors 27 may be configured to detect different types and magnitudes of deformation and provide an output signal indicative of the type and magnitude of the deformation. This may enable the different types and magnitudes of deformation to be used to provide different control inputs to the apparatus 1.

The sensors 27 are configured to provide an output signal to a conversion means 29. The conversion means 29 may comprise any means which may be configured to covert the output signal from the sensors 27 into a control signal which is suitable to be transmitted over the interface 25. For example the conversion means 29 may comprise ND conversion circuits or one or more processors. The one or more processors may be provided with computer program instructions which provide the logic and routines that enable the casing 21 to perform the method illustrated in FIG. 3

The control signal which is transmitted over the interface 25 may comprise data which, when received by the apparatus 1 causes the apparatus 1 to perform a function.

Figure 2:
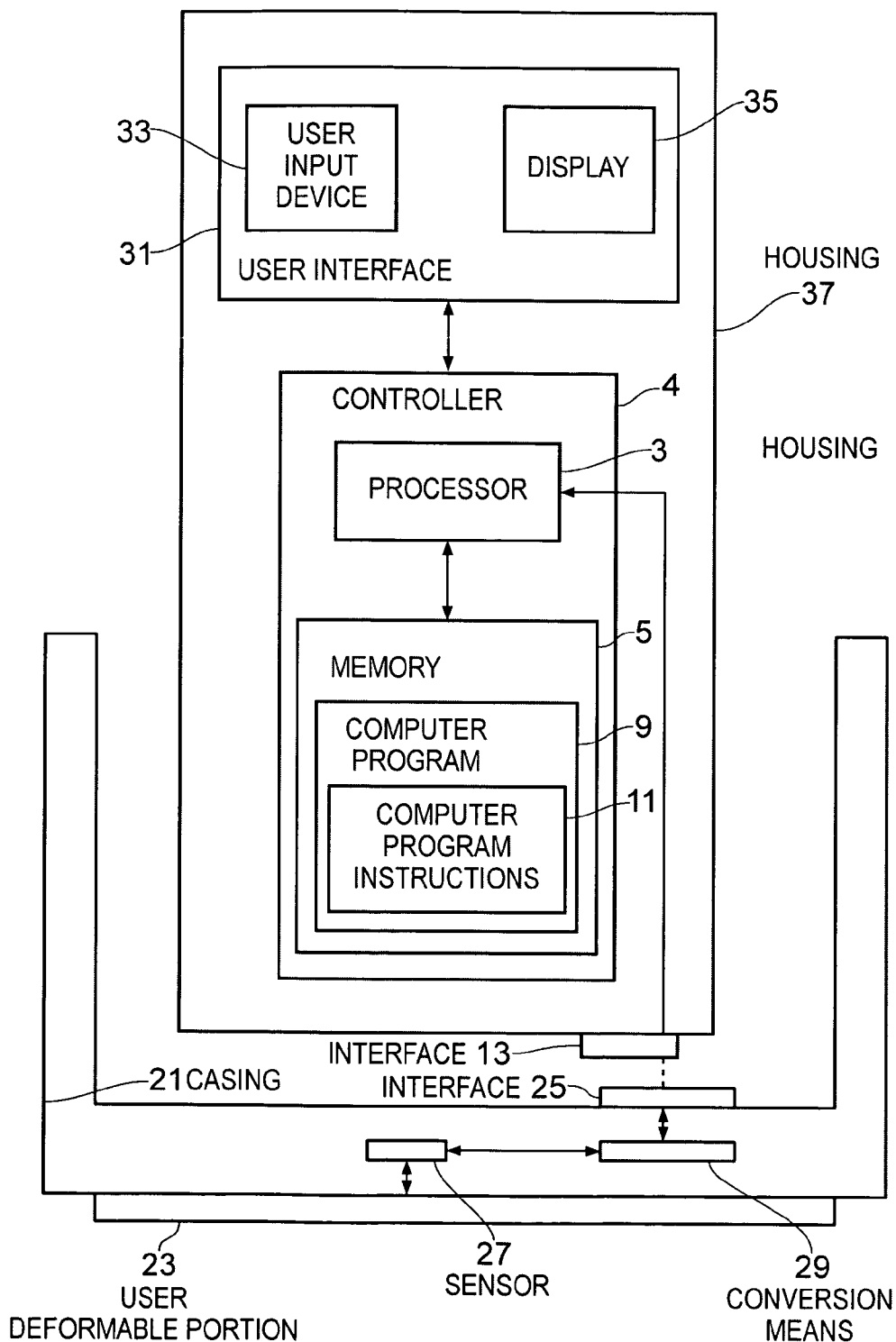
FIG. 2 illustrates a casing and an apparatus according to another embodiment of the disclosure.

FIG. 2 illustrates an apparatus 1 and casing 21 according to another embodiment of the disclosure. In this embodiment the casing 21 may comprise a supplementary cover for the apparatus 1. The apparatus 1 may be a complete apparatus such as a cellular mobile telephone or tablet computer or any other suitable apparatus which comprises both an engine and a housing 37. The casing 21 may be configured to be coupled to the housing 37 of the apparatus 1.

In this exemplary embodiment the apparatus 1 comprises a controller 4 as described above in relation to FIG. 1, however in this further example the apparatus 1 comprises a first housing 37 so that the casing 21 provides an additional protective layer for the housing 37 of the apparatus 1. The apparatus 1 may comprise the additional features of a user interface 31 comprising a user input device 33 and a display 35. The user input device 33 may comprise, for example a portion of a touch sensitive display 35 or any other suitable user input device 33. The user input device 33 and the display 35 may be mounted on the surface of the housing 37.

The housing 37 may comprise rigid portions which may protect the controller 4 of the apparatus 1 from mechanical loadings. The housing 37 may also be configured to protect the apparatus 1 from environmental damage which may be caused by, for example, fluid ingress or temperature variations.

In this exemplary embodiment the casing 21 may be a protective case such as a pouch. The casing 21 may be sized and shaped so that an apparatus 1 may be coupled to the casing 21 by being positioned within the casing 21. In some embodiments the casing 21 may be sized so that a particular model of apparatus 1 fits snugly within the casing 21. In some embodiments the casing 21 may be flexible so that it can be fitted around a range of apparatus 1.

The casing 21 may provide additional protection to the apparatus 1. The casing may also act to protect the housing 27 of the apparatus 1 and any components of the apparatus 1 which may be mounted on the surface of the housing 37 such as the display 35 or user input device 33. For example, the casing 21 may protect and may protect the surface of the housing 37 or the display 15 from damages such as scratches.

In this embodiment the casing 21 may enable the user to use the one or more user deformable portions to make a user input to control the apparatus 1 while the apparatus 1 is within the carry case or pouch. In some embodiments the casing 21 and the apparatus 1 may be configured so that the user input device 33 of the apparatus 1 is not accessible while the apparatus 1 is in the casing 21. In such embodiments the at least one user deformable portion 23 of the casing 21 enables the user to make user inputs without having to remove the apparatus 1 from the casing 21 in order to access the user input device 33 of the apparatus 1.

As described above with relation to FIG. 1 the casing 21 illustrated in FIG. 1 may also comprise at least one user deformable portion 23 and a sensor 27 and conversion means 29 and an interface 25 which are configured to enable a user input comprising deforming the at least one user deformable portion 23 of the casing 21 to be used to control the apparatus 1 when the apparatus 1 is coupled to the casing 21.

Figure 3:
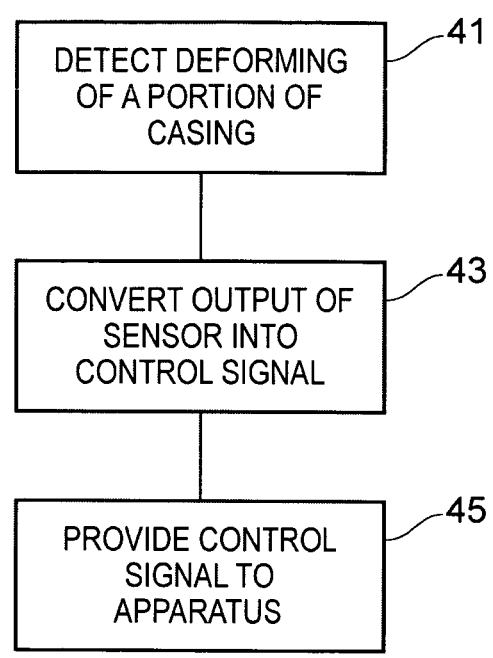
FIG. 3 is a block diagram which schematically illustrates a method according to embodiments of the disclosure.

FIG. 3 is a block diagram which schematically illustrates a method according to embodiments of the disclosure.

At block 41 an apparatus 1 is coupled to a casing 21. The casing 21 may be removably attached to the apparatus 1 as schematically illustrated in FIG. 1 or the casing 21 may comprise a supplementary cover for the apparatus 1 as schematically illustrated in FIG. 2.

At block 41 the user makes an input by deforming a user deformable portion 23 of the casing 21. For example a user applies a force to a portion of the outer surface of the casing 21 which causes the user deformable portion 23 of the casing 21 to change shape.

The user input comprising deforming the user deformable portion 23 may comprise any suitable input. For example the user input may comprise bending a portion of the casing 21. The sensors 27 may be configured to detect the amount of the casing which has been bent, the direction of the bending and the speed at which the apparatus 1 was bent.

In other embodiments the user input comprising deforming the user deformable portion 23 may comprise twisting a portion of the casing 21. In such embodiments the sensors 27 may be configured to detect the size of the area which has been twisted, the axis of rotation of the twist, the location of the twisted portion the speed with which the twisting has taken place and any other property of the twist.

In other embodiments the user input comprising deforming the user deformable portion 23 may comprise compressing or squashing a portion of the casing 21. The user may press a portion of the casing 21 with their finger which may cause that portion of the casing 21 to change shape. The user may hold their finger in the same place. In such embodiments the sensors 27 may be configured to detect the size of the area which has been pressed, the number of times that the area has been pressed, the location of the area that has been pressed. In some embodiments the user may be able to press multiple areas of the casing 21 either sequentially and/or simultaneously. In some embodiments the user may be able to press a portion of the casing 21 and then sweep their finger across the casing 21. In such embodiments the sensors 27 may be configured to detect the start and end points of the sweep and the speed and direction of the sweep.

In some embodiments of the disclosure the user input comprising deforming the user deformable portion 23 may comprise stretching a portion of the casing 21 or the surface of the casing 21. In such embodiments the sensors 27 may be configured to detect the position of the portion of the casing 21 which has been stretched and the size of the area which has been stretched and the amount by which the area has been stretched.

It is to be appreciated that any other suitable type of input comprising changing the shape of a portion of the casing 21 may be used in other embodiments of the disclosure.

The deformation of the user deformable portion 23 of the casing 21 is detected by the one or more sensors 27. The output signal which is provided by the sensors is indicative of the deformation which has been made to the user deformable portion 23 of the casing 21.

In some embodiments the output signal of the sensors 27 may be provided to a conversion means and at block 43 the conversion means may convert the output of the sensors 27 into a control signal. The control signal is configured in a form which enables it to be transmitted from the casing to the apparatus 1. The control signal comprises data which, when transmitted to the apparatus 1 causes the apparatus 1 to perform a function. The data which is contained in the control signal may be determined by the type and magnitude of the deformation which is detected at block 41. This may enable different control signals to be provided in response to different types of user input and so may enable the apparatus 1 to be caused to perform different functions.

At block 45 the control signal is provided to the interface of the casing 25 so that it can be transmitted via the interface 25 to the apparatus 1 to cause the apparatus 1 to perform the appropriate function.

The function which may be performed may be any suitable function. The function which is performed may depend upon a plurality of factors such as the type and magnitude of the deformation of the user deformable portion 23 which is detected, the type of apparatus 1 which is coupled to the casing 21 and the mode of operation of the apparatus 1. Suitable functions may include, muting an apparatus, changing the volume of an apparatus, changing content displayed on a display 35, zooming in and/or out of content displayed on a display 35, scrolling through content displayed on a display 35 or any other suitable function.

Embodiments of the disclosure enable any apparatus 1 which may be coupled to the casing 21 to be responsive to a user input comprising deforming a part of the casing 21.

This provides an advantage that a user can make a user input even if the user input device 33 of the apparatus 1 is inaccessible, for example if the apparatus 1 is completely housed within the casing 21 the user does not need to remove the apparatus 1 from the casing 21 to cause the apparatus 1 to perform a function. Also in some circumstances it may be difficult for a user to actuate the user input device 33 properly, for example if the user input device 33 comprises a touch sensitive display and the casing 21 covers the display or the user is wearing gloves it can make the touch sensitive display harder to actuate. The embodiments of the disclosure provide an alternative user input which addresses these issues.

Furthermore the user input comprising deforming a part of the casing 21 may be a simple user input to make. It may be made quickly and without looking at the apparatus 1 which may be beneficial if the user is in a situation where it may be difficult or disadvantageous to look at the apparatus 1, for example if they are driving or walking or in a meeting.

By positioning the user deformable portions 23 on the casing 21 of the apparatus 1 this provides the benefit that the casing 21 may be adapted for use with a range of apparatus 1. As the casing 21 is user replaceable different casings 21 may be used with the same apparatus 1 and/or the same casing 21 may be used with different apparatus 1. This may enable different types of user input to be detected and cause different functions to be performed by the apparatus 1.

The casing 21 may have a relative large surface area which may be available for the user deformable portions 23 to be located on. For example the user deformable portions 23 may be located anywhere around the side of the casing 21 or on the rear surface of the casing 21. The user deformable portions 23 may be located in the position on the casing 21 which is easiest or most comfortable for a user to reach.

Figure 4:
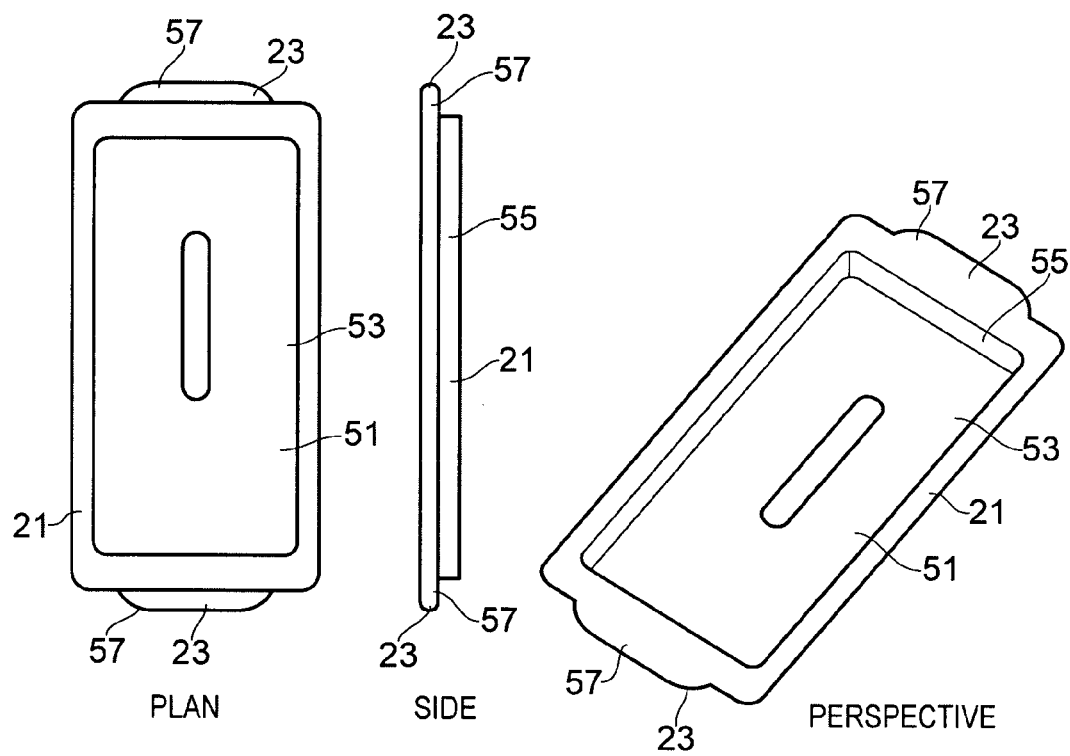
FIGS. 4 to 6 illustrate casings according to exemplary embodiments of the disclosure.
Figure 5:
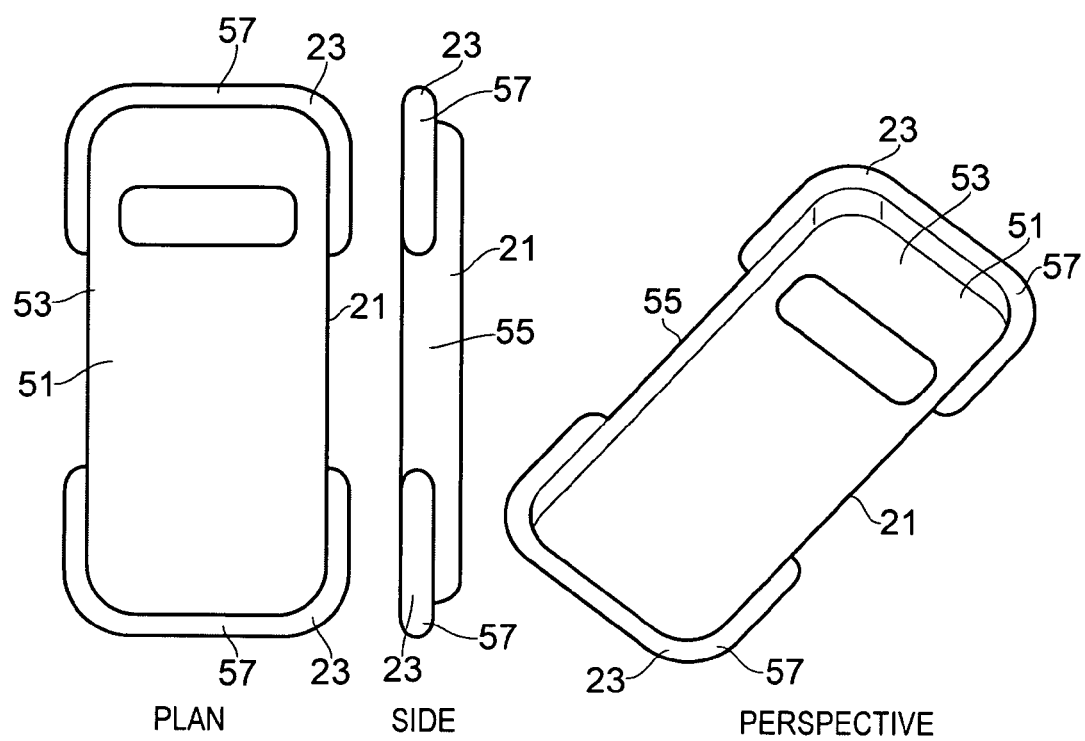
Figure 6:
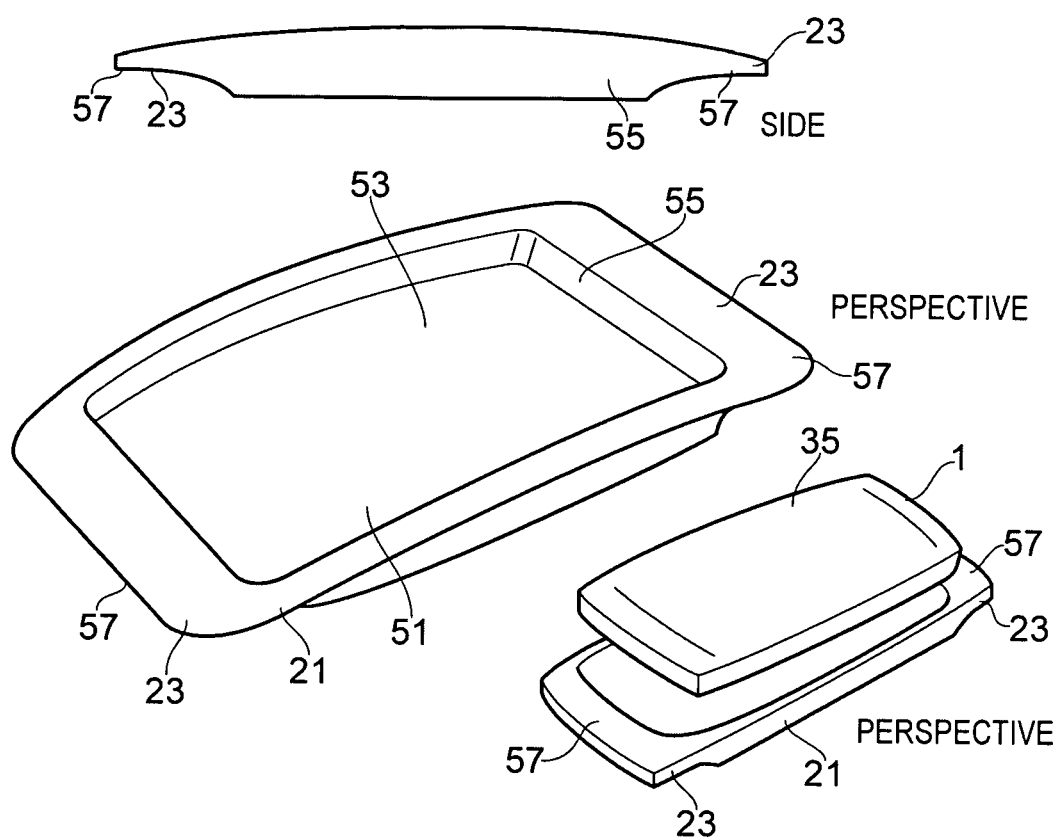

FIGS. 4 to 6 illustrate casings 21 according to exemplary embodiments of the disclosure.

FIG. 4 illustrates a casing 21 in plan view, side view and perspective view. The casing 21 comprises part of a housing which may be used to house an apparatus 1 such as the engine of a mobile cellular telephone. In FIG. 4 the casing 21 comprises the rear and side sections of the housing. The casing 21 may comprise attachment means which enable the casing 21 to be attached to a front section of the housing to provide a completed housing to protect the apparatus 1.

The casing 21 comprises a recess 51 which is formed by a rear surface 53 and the side walls 55. The recess 51 may be shaped so that an apparatus 1 fits snugly within the casing 21.

In the embodiment of FIG. 4 the casing 21 comprises two user deformable portions 23. Each user deformable portion 23 comprises a projection 57 which extends outwards from the edge of the casing 21 at either end of the casing 21. The projection 57 may be deformed by the user of the apparatus 1. For example the projection 57 may be bent or twisted or compressed or stretched by the user of the apparatus 1 to enable the apparatus 1 to perform functions.

FIG. 5 also illustrates a casing 21 in plan view, side view and perspective view. The casing 21 in FIG. 5 also comprises part of a housing which may be used to house an apparatus 1 such as the engine of a mobile cellular telephone and comprises the rear and side sections of the housing. The casing 21 may comprise attachment means which enable the casing 21 to be attached to a front section of the housing to provide a completed housing to protect the apparatus 1.

As in the previously described embodiment the casing 21 illustrated in FIG. 5 comprises a recess 51 which is formed by a rear surface 53 and the side walls 55. The recess 51 may be shaped so that an apparatus 1 fits snugly within the casing 21.

In the embodiment of FIG. 5 the casing 21 comprises two user deformable portions 23. Each user deformable portion comprises a projection 57 which extends outwards from the edge of the casing 21. The first projection 57 extends around the top end of the casing 21 and extends down a portion of the sides of the casing 21 closing to the top end of the casing 21. The second projection 57 extends around the lower end of the casing 21 and extends down a portion of the sides of the casing 21 close to the lower end of the casing 21. The projections 57 may be positioned in locations which make it easy for a user to apply forces to when they are holding the apparatus 1. For example the projections 57 may compressed by the user of the apparatus 1 and so the projections 57 may be positioned so that a user can comfortably squeeze the projections 57 when they are holding the casing 21 in their hand.

FIGS. 4 to 6 illustrate casings 21 according to exemplary embodiments of the disclosure.

FIG. 6 illustrates a casing 21 in side view and perspective view and with an apparatus 1 in position. The casing 21 comprises part of supplementary cover which may be used to provide additional protection to the housing of the apparatus 1.

The casing 21 illustrated in FIG. 6 also comprises a recess 51 which is formed by a rear surface 53 and the side walls 55. The recess 51 may be shaped so that an apparatus 1 fits snugly within the casing 21.

In the embodiment of FIG. 6 the casing 21 comprises two user deformable portions 23. Each user deformable portion comprises a projection 57 which extends outwards from the edge of the casing 21 at either end of the casing 21. The projection 57 may be deformed by the user of the apparatus 1. For example the projection 57 may be bent or twisted or compressed or stretched by the user of the apparatus 1 to enable the apparatus 1 to perform functions.

The apparatus 1 may be configured to fit tightly within the casing 21 so that the user input device 33 and display 35 of the apparatus 1 can still be accessed by the user when the apparatus 1 is coupled to the casing 21.

The blocks illustrated in FIG. 3 may represent steps in a method and/or sections of code in a computer program. The illustration of a particular order to the blocks does not necessarily imply that there is a required or preferred order for the blocks and the order and arrangement of the block may be varied. Furthermore, it may be possible for some blocks to be omitted.

For example, in some embodiments of the disclosure the interface 25 of the casing 21 may be configured to provide the output signal from the sensors directly to the apparatus 1 without converting the signal first. The apparatus 1 may then be configured to convert the signal received from the casing 21 to determine the type and/or size of the deformation of the user deformable portion 23 of the casing 21 and cause the apparatus 1 to perform an appropriate function.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

Although embodiments of the present disclosure have been described in the preceding paragraphs with reference to various examples, it should be appreciated that modifications to the examples given can be made without departing from the scope of the disclosure as claimed. For example in some embodiments the casing 21 may be configured to provide feedback to a user when a user input has been made. For example the casing 21 may comprise means for providing feedback to a user which provides an indication when a user input comprising deforming the user deformable portion 23 has been detected. The means for providing feedback may comprise any means which can be detected by the user of the apparatus 1, for example the feedback may comprise visual feedback provided by means such as a light or LED (light emitting diode) or tactile feedback such as vibration of a portion of the casing 21 or a change in the tactile properties of the casing 21 such as the stiffness, or surface texture. In other embodiments the feedback may be provided by the apparatus 1 which is coupled to the casing 21. In such embodiments the feedback may comprise for example, information displayed on a display 31, an audio output which may be provided by an audio output device such as a loudspeaker or a tactile feedback such as a vibration of the apparatus 1.

In some embodiments the casing 21 and/or the apparatus 1 may be configured to prevent unintentional actuation of the at least one user deformable portion 23. For example, the apparatus 1 may comprise a key lock function which causes the apparatus 1 to ignore any user input except an unlock input. The unlock input could be a predetermined sequence of actuations of the at least one user deformable portion 23, or an interrupt such as an incoming call.

In some embodiments the casing 21 may be lockable independently of the apparatus 1 or of other user input device associated with the apparatus 1. For example a user may be able to make a predetermined sequence of deformations which could be used to lock the at least one user deformable portion 23 of the casing 21 so that any further deformations are ignored. The user may be able to make an unlock sequence of deformations to cause the casing 21 to be unlocked and enable further user inputs to be made via the casing 21.

Also in the above described embodiments the casing 21 is configured to provide a control signal to an apparatus 1 which is removably coupled to the casing 21. In some embodiments the interface 25 of the casing 21 may be configured so that the casing 21 can provide a control signal to an apparatus 1 which is remote from the casing 21. This may enable the casing 21 to act as a remote controller for the apparatus 1.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

We claim:

1. A casing comprising:
   at least one user deformable portion;
   at least one sensor configured to detect deformation of the at least one user deformable portion;
   wherein the casing is configured to be removably coupled to an apparatus and is configured so that, in response to detecting the deformation of the user deformable portion of the casing, a control signal for control of the apparatus is provided;
   wherein the control signal is indicative of the type and magnitude of the deformation of the user deformable portion of the casing; and
   wherein each user deformable portion is a single continuous portion that forms a continuous surface with adjacent portions of the casing that are not user deformable.

2. A casing as claimed in claim 1 wherein the casing is configured to protect the apparatus from environmental damage.

3. A casing as claimed in claim 1 wherein the casing comprises part of a housing for the apparatus.

4. A casing as claimed in claim 1 wherein the casing comprises a covering configured to receive an apparatus wherein the apparatus comprises a first housing.

5. A casing as claimed in claim 1 wherein the casing comprises an interface configured to enable a control signal to be transmitted from the casing to the apparatus, wherein the interface is configured to enable a control signal to be transmitted to an apparatus remote from the casing.

6. A casing as claimed in claim 1 wherein the casing is configured to convert an output from the one or more sensors into the control signal which is transmitted over the interface.

7. A casing as claimed in claim 1 wherein the control signal comprises data which, when transmitted to the apparatus, causes the apparatus to perform a function.

8. A casing as claimed in claim 1, wherein the casing can be one or more of folded, squeezed, twisted, bent, stretched.

9. A casing as claimed in claim 1, wherein the deformable portion deforms in one or more of the following ways: bending, folding, twisting.

10. A casing as claimed in claim 1, wherein the deformable portion comprises a plurality of hinged or jointed segments.

11. An apparatus as claimed in claim 1, wherein different control inputs to the apparatus can be provided by bending the deformable portion and twisting the deformable portion.

12. A casing as claimed in claim 1, wherein the deformable portion is a flexible substrate and comprises a foam material.

13. A casing as claimed in claim 1, wherein the deformable portion comprises a deformable material, wherein the deformable material comprises one of: a gel, powder or fluid in a sealed sac.

14. An apparatus as claimed in claim 1, wherein the deformable portion is configured to enable removable coupling of the casing to the apparatus.

15. A method comprising:
    detecting a user input comprising deforming at least one user deformable portion of a casing of an apparatus;
    providing, in response to detecting the user input, a control signal to an apparatus configured to be removably coupled to the casing, to cause the apparatus to perform a function;
    wherein the control signal is indicative of the type and magnitude of the deformation of the user deformable portion of the casing; and
    wherein each user deformable portion is a single continuous portion that forms a continuous surface with adjacent portions of the casing that are not user deformable.

16. A method as claimed in claim 15 wherein the casing is configured to protect the apparatus from environmental damage.

17. A method as claimed in claim 15 wherein the casing comprises part of a housing for the apparatus.

18. A method as claimed in claim 15 wherein the casing comprises a covering configured to receive an apparatus wherein the apparatus comprises a first housing.

19. A non-transitory computer-readable storage medium embodying a computer program comprising computer program instructions that, when executed by at least one processor, enable a casing at least to perform:
    detecting a user input comprising deforming at least one user deformable portion of a casing of an apparatus;
    providing, in response to detecting the user input, a control signal to an apparatus configured to be removably coupled to the casing, to cause the apparatus to perform a function;
    wherein the control signal is indicative of the type and magnitude of the deformation of the user deformable portion of the casing; and
    wherein each user deformable portion is a single continuous portion that forms a continuous surface with adjacent portions of the casing that are not user deformable.

* * * * *